United States Patent [19]

Aubertot

[11] Patent Number: 5,445,492

[45] Date of Patent: Aug. 29, 1995

[54] STRAIGHT SETTING PATTERN FOR CLAY BRICKS

[76] Inventor: Christophe Aubertot, 2792 S. Knoxville Way, Denver, Colo. 80227

[21] Appl. No.: 223,337

[22] Filed: Apr. 5, 1994

[51] Int. Cl.6 ............................................. B65G 57/00
[52] U.S. Cl. .................................... 414/786; 414/931; 206/322
[58] Field of Search ............... 414/786, 931; 206/322; 432/5, 6, 122

[56] References Cited

U.S. PATENT DOCUMENTS

| | | | |
|---|---|---|---|
| 2,406,554 | 8/1946 | Marsh | 432/6 |
| 3,179,724 | 4/1965 | Jones | 432/5 |
| 3,363,781 | 1/1968 | Magnetti | 414/931 |
| 3,474,917 | 10/1969 | Pearne et al. | 414/931 |
| 4,586,898 | 5/1986 | Orbeck | 432/122 |
| 4,629,417 | 12/1986 | Patalon | 432/5 |
| 4,878,838 | 11/1989 | Verheyden, Jr. | 432/8 |
| 5,117,545 | 6/1992 | DiGiusto | 29/33 |

Primary Examiner—Michael S. Huppert
Assistant Examiner—Douglas A. Hess
Attorney, Agent, or Firm—Henderson & Sturm

[57] ABSTRACT

A straight setting pattern (100) for clay bricks (10) on a conventional support base (101) to provide uniform air circulation and exposure to heat to the maximum surface area on the bricks (10) by arranging a plurality of equally spaced stacks (116) (117), etc. of stacked bricks (10) into parallel columns (113) (114) to create a first tier of bricks, then covering the top of the tier of bricks with at least one stabilizing plate (110) and then repeating the process for successive tiers of bricks, wherein each tier is aligned in parallel with the other tiers.

6 Claims, 2 Drawing Sheets

STRAIGHT SETTING PATTERN FOR CLAY BRICKS

TECHNICAL FIELD

This present invention relates to the field of brick making in general, and in particular, to a new method for drying and/or firing clay bricks to produce a more uniform finished product.

BACKGROUND ART

As can be seen by reference to the following U.S. Pat. Nos. 4,878,838; 4,629,417; 4,586,898; and 5,117,545; the prior art is replete with myriad and diverse tunnel drying and/or firing processes for ceramic materials.

While all of the aforementioned prior art constructions are more than adequate for the basic purpose and function for which they have been specifically designed, these processes involve sequential treatment of single flat slabs or stacked slabs wherein the conventional way of stacking the items involves a cross-set; wherein the first one or two courses of products are set in one direction and the next one or two courses of product are set perpendicular to the first one or two courses. This cross-setting arrangement while providing stability requires incremental adjustment of the spacing between bricks. This, plus the fact that the brick set at 90° are a barrier to the longitudinal air flow of the tunnel, lead to a non-uniformed and non-optimized drying or firing of the finished product.

As a consequence of the foregoing situation, there has existed a longstanding need in the brick-making industry for a new method that may be employed on a moving hearth that will provide for proper air circulation between the adjacent courses and which will improve quality control via a uniform drying and/or firing exposure; and, the provision of such a method is a stated objective of the present invention.

DISCLOSURE OF THE INVENTION

Briefly stated, the straight setting pattern for clay bricks that forms the basis of the present invention involves aligning the uncured bricks in parallel courses in stacked columns of typically two to six bricks in height for about 16 inches high; wherein, generally flat stabilizing plates are disposed between the stacked columns at regular intervals to provide stability to the straight setting pattern.

This setting pattern allows the operator to easily set the spacing between the two products which will provide the optimum air ventilation for drying and heat treatment for firing thereby maximizing the energy efficiency of the kin or hearth.

As will be explained in greater detail further on in the specification, since all of the products are aligned in the same direction and parallel to the tunnel air flow, all of the products receive the same drying and/or firing treatment thus, improving the quality control of the finished product.

In addition, the straight setting pattern is much more flexible than the cross-setting pattern in allowing different sized product to be loaded on a moving hearth while still maintaining the optimum spacing between products for the purposes of drying and/or firing.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
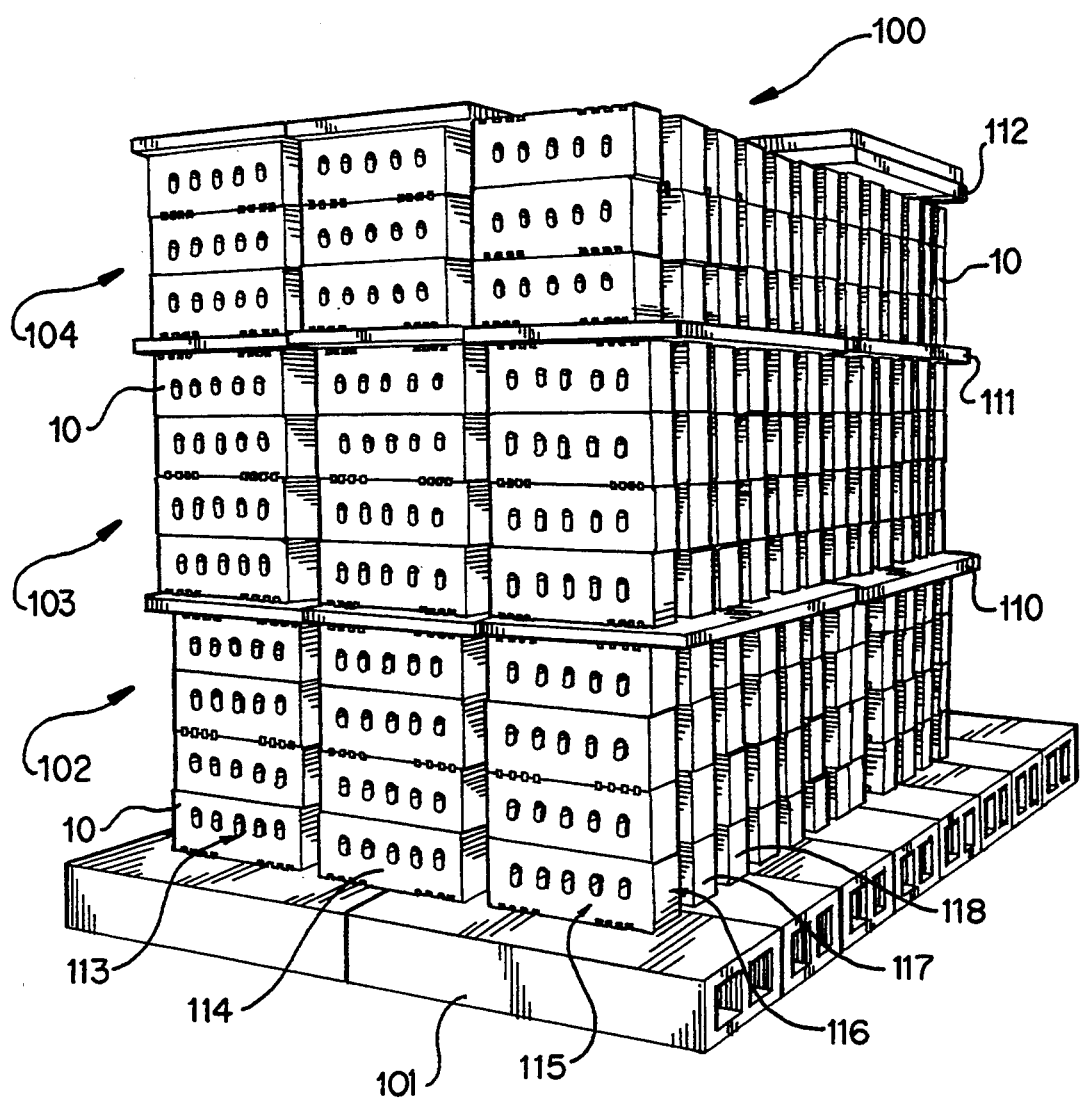
FIG. 1 a perspective view of the straight setting pattern for clay bricks that forms the basis of the present invention.

As can be seen by reference to the drawings, and in particular to FIG. 1, the straight setting pattern for clay bricks that forms the basis of the present invention is designated generally by the reference numeral (100).

Figure 2:
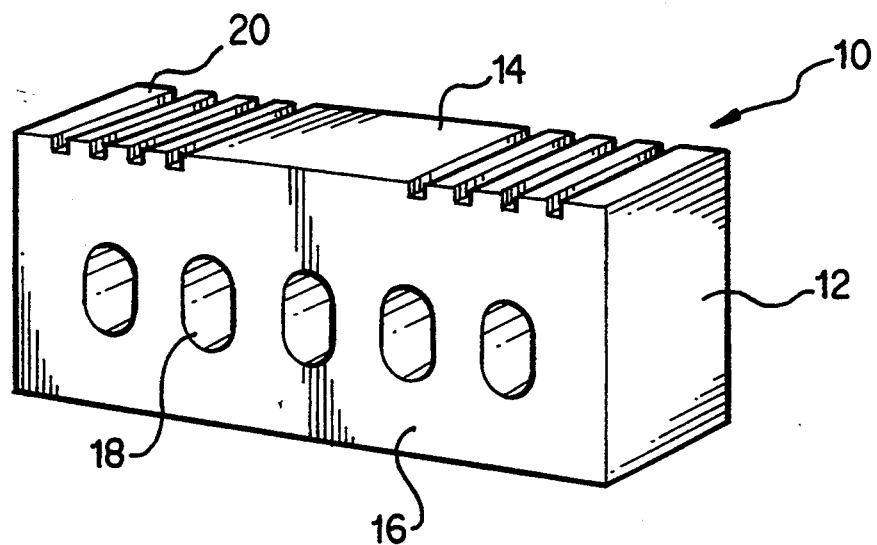
FIG. 2 an isolated perspective view of a representative clay brick to be employed in this invention.
Figure 3:
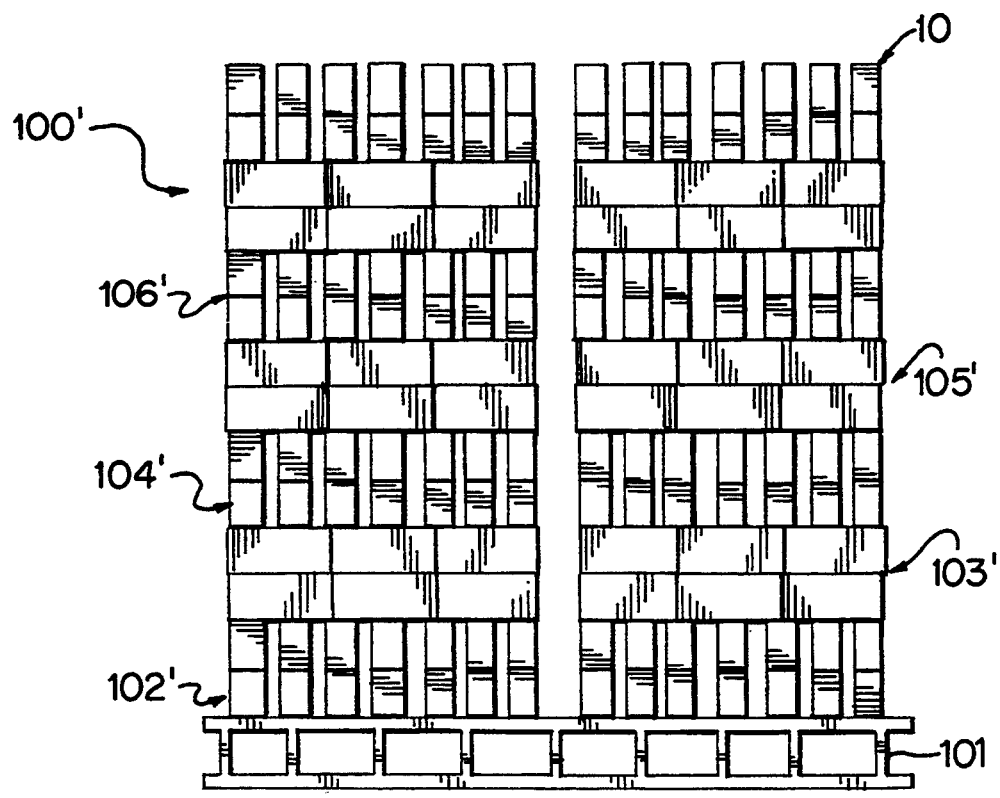
FIG. 3 a perspective view of the prior art cross-setting pattern for bricks that is the current industry standard.

Prior to embarking on a detailed description of the straight setting pattern (100) of this invention, it would first be advisable to describe both the prior art cross-setting pattern designated generally as (100') in FIG. 3, as well as a representative product such as a clay brick (10) shown in FIG. 2 that would be employed in both the straight setting pattern (100) or the cross-setting pattern (100').

As shown in FIG. 3, the cross-setting pattern (100') typically involves a first course (102') of pairs of bricks (10) disposed in parallel fashion along one axis of orientation upon which is stacked a second course (103') of pairs of bricks (10) which are aligned perpendicular to said first course (102') of bricks (10); followed by a third course (104') of pairs of bricks (10); disposed perpendicular to said second course (103') and parallel to said first course (102'); wherein, succeeding courses (105') (106'), etc. pairs of bricks (10) change their orientation by 90°. This alternating orientation of successive courses provides stability to the cross-setting pattern (100') as it rests on a conventional support base (101) that is to be transported through a traveling hearth.

Turning now to FIG. 2, it can be seen that a typical clay brick (10) that would be employed in the straight setting pattern (100) of this invention, comprises a generally elongated rectangular body (12) having a plurality of grooves (20) formed on one of its narrowed elongated surfaces (14) and having a plurality of enlarged openings (18) which extend through the wider elongated surfaces (16).

As can best be seen by reference to FIG. 1, the straight setting pattern (100) that forms the basis of the present invention requires the presence of a plurality of stabilizing plates (110) (111) and (112) in order to practice the teachings of this invention.

As shown in FIG. 1, the straight setting pattern (100) employs a plurality of columns (113) (114) (115) and a plurality of stacks (116) (117) (118) of bricks arranged in parallel rows.

In the preferred embodiment depicted in FIG. 1, the lower (102) and intermediate (103) tier of bricks (10) comprise columns (113) (114) and (115) and a plurality of stacks (116) (117) (118), etc. of bricks; wherein each stack (116) comprises 2 to 6 bricks (10) high wherein the elongated narrow side of the bottom brick rests on a conventional support bases (101) with each successive brick (10) in the stack (116) being aligned in the same orientation relative to the brick which it rests upon.

It should also be noted at this juncture, that at least one generally flat rectangular stabilizing plate (110) is disposed intermediate to the first (102) and second (103) tiers of bricks and that each tier (102) (103) (104) will have at least one stabilizing plate (110) (111) and (112) resting on top of the respective tiers, to provide lateral stability to the individual stacks (116) (117) (118), etc. of bricks.

Turning now to the upper portion of FIG. 1, it can be seen that the upper tier (104) of bricks only comprises three bricks in each stack (116) (117), etc., which would normally be considered to be the minimum number of bricks required to impart a significant degree of lateral instability to each stack (116) (117). However, it is to be understood that this invention is intended to be practiced with as few as two bricks in each stack in keeping with the teachings contained herein.

It should also be appreciated that the heart of this invention revolves around two key principles which are as follows: maintaining a uniform spacing between both the individual stacks and, to a lesser degree, columns that comprise each pier to promote uniform circulation and exposure to air flow and heat of the individual bricks so that the finished product will have extremely high quality control standards, and providing stabilizing plates (110) (111) (112) on top of each tier (102) (103) (104) of bricks to counteract the lateral instability which is inherent when bricks are stacked in the aforementioned manner to expose the maximum surface area to the effects of drying and heat treatment.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A method of stacking bricks in individual stacks at least two bricks high on a conventional support base so that the surface area of the bricks are exposed to uniform air circulation and heat treatment comprising the following steps:
    a) placing a first series of uniform height stacks of bricks on top of the conventional support base; wherein, the stacks of bricks are arranged into equally spaced parallel rows of bricks to form a column;
    b) aligning a plurality of said columns in a parallel relationship to one another, wherein each of the columns are spaced from one another to create a first tier of bricks; and
    c) placing at least one enlarged generally flat rectangular stabilizing plate in contact with the top surface of said first tier of bricks.

2. The method of stacking bricks as in claim 1; wherein, said equally spaced parallel row of bricks comprise at least two rows.

3. The method of stacking bricks as in claim 1; wherein, said plurality of columns comprise at least one column.

4. The method of stacking bricks as in claim 1; further comprising the steps of:
    d) placing a second series of uniform height stacks of bricks on top of said at least one generally flat rectangular stabilizing plate to create a second tier of bricks; wherein, the stacks of bricks are arranged into equally spaced parallel rows of bricks to form a column; and
    e) aligning a plurality of said columns in a parallel relationship to one another, wherein each of the columns are spaced from one another.

5. The method of stacking bricks as in claim 4, wherein said first tier of bricks and said second tier of bricks are aligned parallel with one another.

6. The method of stacking bricks as in claim 5 further comprising the step of:
    f) placing at least one enlarged generally flat rectangular stabilizing plate on top of said second tier of bricks.

* * * * *